Patented June 6, 1939

2,161,205

UNITED STATES PATENT OFFICE 2,161,205

INK

William H. Shields, Cincinnati, Ohio, assignor to The Palm Bros. Decalcomania Co., Cincinnati, Ohio, a corporation of Ohio No Drawing. Original application December 7, 1934, Serial No. 756,505. Divided and this application January 20, 1936, Serial No. 59,896

3 Claims. (Cl. 134—29)

My invention relates to thermal compounds.

It is the object of my invention to provide a compound which when heated will change its color, either temporarily or permanently.

It is particularly adaptable for use in labels, wrappers and the like, and in government stamps, government labels, or in any form of document the genuineness of which must be quickly and accurately determined.

It is my object to provide a compound which, upon the application of a slight amount of heat, such as that from a lighted cigarette, will change its color temporarily or permanently.

It is a further object to provide a compound which will change its color upon any equivalent treatment as to that of heat, such as by moisture or by a re-agent.

As typical examples of the materials which may be used, I list the following:

Example 1.—*Silver mercuric iodide*

I provide a mixture of mercury, silver and iodine with suitable re-agents in order to produce the double iodides of mercury and silver, giving a yellow color that turns to red upon the application of heat, such as the heat from a lighted cigarette, and will return to yellow upon cooling.

This compound is best prepared by precipitating it from a solution of potassium mercuric iodide with silver nitrate. It is a yellow insoluble compound which changes to an orange-red color on gently heating and returns to its original color on cooling.

By using approximately the theoretical quantities of each chemical required the best yield is obtained. For example, 80 grams of mercuric chloride are dissolved in a suitable quantity of water, say one liter, and to this is added slowly, with stirring, 200 grams of potassium iodide dissolved in another liter of water. At first a bright red precipitate is formed which should be completely re-dissolved when all of the potassium iodide has been added. In a third liter of water is dissolved 100 grams of silver nitrate and this solution is added slowly and with stirring to the above solution. The yellow precipitate formed is silver mercuric iodide which is filtered off and washed with water thoroughly before drying.

Example 2.—*Copper mercuric iodide*

I provide a mixture of mercury, copper and iodine with suitable re-agents to produce the double iodides of mercury and copper. When cooled this gives a red color that, upon being subjected to heat, turns to black-brown, and upon cooling, returns to red.

This is prepared in a similar manner to the silver mercuric iodide excepting copper sulphate is used in place of the silver nitrate.

To prepare it 110 grams of mercuric chloride are dissolved in one liter of water and to this is added 270 grams of potassium iodide dissolved in another liter of water. The red precipitate formed at first should be completely dissolved when all of the potassium iodide has been added. To this solution is added a solution of 100 grams of copper sulphate in one liter of water. The red precipitate formed is copper mercuric iodide. This should be filtered off and washed first with a dilute solution of sodium thiosulphate until all traces of iodine are removed and then washed with water. The precipitate when dried is ready for use.

Copper mercuric iodide is a bright red compound changing to a deep chocolate brown color on heating and returning to its original color on cooling.

Example 3.—*Mercuric iodide*

A typical change of color that remains changed when heated is a mercuric iodide which becomes yellow when heated but does not return to its original color upon cooling. This material can be incorporated in the ink.

Mercuric iodide is prepared by precipitating from a solution of mercuric chloride with potassium iodide. It is a bright red compound changing to a lemon yellow on heating. Unlike the above compounds it does not readily return to its original color on cooling. However, if it is rubbed the red color is restored instantly.

To prepare it 100 grams of mercuric chloride dissolved in about one liter of water, and to this added a solution of 122 grams of potassium iodide also in one liter of water. The red precipitate is filtered off and washed thoroughly with water and then dried.

Example 4

If desired, there can be incorporated in the printing ink the intermediates used for producing the resulting dye stuff, which when brought together in a suitable medium, form a dye. For instance, betanaphthol is placed in the ink and if it is tested with paranitraniline a red dye will be produced, which gives para red. No heat is necessary for this change.

Example 5

Dry phenolphthalein and dry sodium carbonate can be placed in the ink and upon moisture being added a red color results from the reaction of the water on the phenolphthalein and the sodium carbonate. If desired, one of these elements can be mixed in the ink and then the printing treated with a solution of the other, in the presence of moisture, to get the same result.

Example 6

There can be incorporated in the decalcomania litmus color or paper which will change color upon the application of moisture. For instance, calcium oxide when moistened turns pink litmus paper blue.

EXAMPLE 7

Cobalt chloride can be employed in the decalcomania and, upon the application of sodium silicate, it will change any color.

EXAMPLE 8

Calcium oxide when moistened will turn pink litmus paper blue; ferric ammonium sulphate solution when treated with sodium silicate turns red to brown. Manganese sulphate solution when treated with sodium silicate turns pink. Sodium carbonate when treated with water and nickel ammonium sulphate solution will turn a light green.

It will be understood that the compound in question must be of such character that it may be either mixed with paper or ink or glue constituting the adhesive. It must not react with any of the materials in which it is located or on which it is mounted. It is preferred that it be one that will respond to the slight heat of a cigarette or a slight amount of moisture as from the tip of the tongue or from a small amount of re-agent so as to enable the tester to determine whether the product in question is a genuine one by the peculiar change that takes place upon the testing of the product.

In preparing these compounds all equipment must be made of glass, porcelain, nickel, Monel metal, stainless steel, or chromium plated to prevent discoloration and decomposition of the compounds.

In the preparation of the copper mercuric iodide free iodine is produced as a by-product of the reaction. This is due to the reduction of the cupric salt to the cuprous state. It is possible that this may be avoided by reducing the cupric salt with some reducing agent before reacting with the iodide and thus increasing the yield of the color.

If these compounds are to be ground with oils or varnish it is possible that special vehicles will be required to prevent discoloration of the color. Also, some substitute may be required for the usual metallic driers as these may likewise cause discoloration. Vehicles of the synthetic lacquer type will prove satisfactory.

This application is a division of my application Serial No. 756,505, filed December 7, 1934.

It will be understood that I desire to comprehend within my invention such modifications as come within the scope of the claims and the invention.

Having thus fully described my invention, what I claim as new and desire to secure by Letters Patent, is:

1. A method of changing the color of an ink containing metallic ammonium sulphate compounds selected from the group consisting if iron, manganese and nickel by applying thereto an aqueous solution of an alkaline alkali metal compound selected from the group consisting of an alkali metal carbonate and an alkali-metal silicate.

2. A method of changing the color of an ink consisting in applying an aqueous solution of an alkali-metal carbonate to an aqueous solution of a metallic sulphate compound selected from the group consisting of iron, manganese and nickel.

3. A method of changing the color of an ink consisting in applying an aqueous solution of an alkali-metal silicate to an aqueous solution of a metallic sulphate compound selected from the group consisting of iron, manganese and nickel.

WILLIAM H. SHIELDS.